United States Patent
Grote et al.

(10) Patent No.: US 9,485,995 B2
(45) Date of Patent: Nov. 8, 2016

(54) METHOD FOR THE PRODUCTION OF BAKED GOODS AND PLANT FOR THE AUTOMATIC PRODUCTION OF BAKED GOODS

(75) Inventors: Bernd Grote, Tamm (DE); Uwe Benz, Giengen (DE)

(73) Assignee: WERNER & PFLEIDERER INDUSTRIELLE BACKTECHNIK GMBH, Tamm (DE)

( * ) Notice: Subject to any disclaimer, the term of this patent is extended or adjusted under 35 U.S.C. 154(b) by 1114 days.

(21) Appl. No.: 13/128,991

(22) PCT Filed: Nov. 4, 2009

(86) PCT No.: PCT/EP2009/007899
§ 371 (c)(1),
(2), (4) Date: Nov. 18, 2011

(87) PCT Pub. No.: WO2010/054773
PCT Pub. Date: May 20, 2010

(65) Prior Publication Data
US 2012/0052155 A1  Mar. 1, 2012

(30) Foreign Application Priority Data

Nov. 12, 2008  (DE) .......................... 10 2008 056 881

(51) Int. Cl.
*A21D 8/02* (2006.01)
*A21B 7/00* (2006.01)
(Continued)

(52) U.S. Cl.
CPC . *A21C 3/04* (2013.01); *A21C 5/00* (2013.01); *A21C 9/08* (2013.01); *A21C 13/00* (2013.01)

(58) Field of Classification Search
CPC ............ A21C 3/10; A21C 3/08; A21C 3/04; A21C 5/00; A21C 9/081; A21C 9/088; A21C 11/002

USPC ............................ 426/231, 19; 83/74, 13, 77
See application file for complete search history.

(56) References Cited

U.S. PATENT DOCUMENTS 3,595,671 A * 7/1971 Cooke et al. .................... 426/23
4,373,892 A * 2/1983 Nordmann .................... 425/207
(Continued)

FOREIGN PATENT DOCUMENTS

DE    1906825 A1   10/1970
DE    4442934 A1    6/1996
(Continued)

OTHER PUBLICATIONS

"Kontinuierliche Knetmaschine ZPM", Werner & Pfleiderer, 13 pages.
(Continued)

*Primary Examiner* — Steven Leff
(74) *Attorney, Agent, or Firm* — Browdy and Neimark, PLLC

(57) ABSTRACT

A plant for the automatic production of baked goods using a dough strand has a kneading device to knead dough from prepared starting products. An extruder is used to extrude the dough to form the dough strand. A portioning device is used to divide the dough strand into dough strand portions of a predetermined weight. A post-preparation device is used to finish the baked goods from the dough strand portions. The post-preparation includes the supplying of the dough strand portions to associated receivers in at least one transporting mould, fermenting the dough strand portions in the transporting mould and baking the fermented dough strand portions. The result is a production plant with an increased throughput in the production of baked goods and simultaneously a plant outlay which is as low a possible.

10 Claims, 3 Drawing Sheets

(51) Int. Cl.
*A21C 3/04* (2006.01)
*A21C 5/00* (2006.01)
*A21C 9/08* (2006.01)
*A21C 13/00* (2006.01)

(56) References Cited

U.S. PATENT DOCUMENTS

| | | | |
|---|---|---|---|
| 4,696,329 A * | 9/1987 | Izzi | 141/1 |
| 4,960,601 A * | 10/1990 | Cummins | 426/504 |
| 5,242,698 A | 9/1993 | Knost et al. | |
| 5,417,992 A * | 5/1995 | Rizvi | A21C 1/003 366/85 |
| 6,920,739 B2 * | 7/2005 | Finkowski et al. | 53/435 |
| 7,261,130 B2 * | 8/2007 | Porter et al. | 141/129 |
| 7,287,973 B2 | 10/2007 | Bodenstorfer | |
| 7,593,785 B2 * | 9/2009 | Blaine et al. | 700/186 |
| 7,715,935 B2 * | 5/2010 | Vogeley et al. | 700/97 |
| 7,809,522 B2 * | 10/2010 | Wargon | 702/156 |
| 8,166,856 B2 * | 5/2012 | Kim et al. | 83/13 |
| 8,375,833 B2 * | 2/2013 | Schmidt | 83/77 |
| 8,688,259 B1 * | 4/2014 | Blaine et al. | 700/186 |
| 2006/0240160 A1 | 10/2006 | Peitzmeier et al. | |
| 2008/0095602 A1 | 4/2008 | Verfurth et al. | |
| 2011/0138977 A1 * | 6/2011 | Birgisson | 83/13 |

FOREIGN PATENT DOCUMENTS

| | | |
|---|---|---|
| DE | 10136980 A1 | 9/2002 |
| DE | 202006015161 U1 | 2/2007 |
| EP | 0548482 A1 | 6/1993 |
| EP | 1424900 A2 | 6/2004 |
| EP | 1714556 A2 | 10/2006 |
| WO | WO 2006030454 A1 * | 3/2006 ... A21C 3/10 |
| WO | WO 2007022782 A2 | 3/2007 |
| WO | WO 2008093364 A1 | 8/2008 |

OTHER PUBLICATIONS

Alava, et al., "Development of continuous vacuum dough preparation process for industrial bakeries (COVAD)", Campden & Chorleywood Food Research Association, Jun. 2002-May 2004, 24 pages.

* cited by examiner

METHOD FOR THE PRODUCTION OF BAKED GOODS AND PLANT FOR THE AUTOMATIC PRODUCTION OF BAKED GOODS

RELATED APPLICATIONS

This application claims the priority of German Patent Application, Serial No. 10 2008 056 881.3, filed Nov. 12, 2008, the content of which is incorporated herein by reference in its entirety as if fully set forth herein.

FIELD OF THE INVENTION

The invention relates to a method for the production of baked goods. Furthermore, the invention relates to a plant for the automatic production of baked goods.

BACKGROUND OF THE INVENTION

A baked goods production method and a plant for automatically producing baked goods are known from public prior use. In particular, a dough dividing machine, a rounder and an intermediate fermenting cabinet are used in the known automatic production methods.

SUMMARY OF THE INVENTION

An object of the present invention is to increase the throughput of a production method and an automatic production plant of the type mentioned at the outset and to thus keep the plant outlay as low as possible.

This object is achieved according to the invention, with regard to the production method, by a method for the production of baked goods using a dough strand comprising the following steps:
 kneading a dough from prepared starting products,
 extruding the dough to form the dough strand,
 dividing the dough strand into dough strand portions of a predetermined weight,
 supplying the dough strand portions to associated receivers in at least one transporting mould,
 fermenting the dough strand portions in the transporting mould,
 baking the fermented dough strand portions.

The object of the present invention is to increase the throughput of a production method and an automatic production plant of the type mentioned at the outset and to thus keep the plant outlay as low as possible.

This object is achieved according to the invention, with regard to the production method, by a method having the method steps disclosed in claim 1.

A virtually continuous production process is possible using the production method according to the invention. The dough strand extrusion allows a very high dough throughput for the method. By dispensing with the conventional method steps of dividing dough in a dough dividing machine and rounding, a clear simplification of the process is produced. Because of the dough strand processing, very long dough strand portions, in particular, can be baked, which may, in particular, be 3 m or 1.5 m in length. This reduces the waste in comparison to a conventional production method, in particular in the production of bread for toast. The extrusion of the dough strand leads to the possibility of producing qualitatively very high-grade baked goods with an attractive, uniform pore distribution and pore size. The preparation of the starting products to form the dough to be kneaded can also take place by the continuous supply of the starting products. The preparation can thus take place by supplying or feeding the starting products. A post-shaping step to shape the dough strand portion may also be located between the dividing of the dough strand into dough strand portions and the supplying of the dough strand portions to the associated receivers. The receivers associated with the dough strand portions in the at least one transporting mould, as well as the transporting mould itself, may be baking moulds. The receivers and the transporting moulds may also be fermenting carriers. In this case, the dough strand portions may be separated from the fermenting carriers before a final baking process, so the fermenting carriers do not have to be exposed to baking temperatures. Using the production method according to the invention, in particular, a precise specification, in particular a precise weight specification, of the divided dough strand portions is possible. This leads to an advantageous reduction in the measurement tolerances in the fully baked dough strand portions. Precisely when very long dough strand portions are processed, at a given volume throughput, the number of end pieces, in other words, the ends of the dough strand portions at both sides, is considerably reduced. The product waste during the production of baked goods is also correspondingly reduced. The supplying of the dough strand portions to the associated receivers in the at least one transporting mould can take place with a high positional precision, which may, in particular, be better than +/−10 mm in the transverse direction and/or in the longitudinal direction of the dough strand portions. This ensures that the dough strand portions, when being supplied to the receivers, are not undesirably compressed, for example by impact on side walls of the receivers, which would contribute to an undesired difference in the baking result.

A volume measurement, in which the volume of the dough strand is measured after the extrusion of the dough strand and before it is divided into portions, or a density measurement, in which the density of the dough strand is measured after the extrusion of the dough strand and before it is divided into portions, improve the precision of the production method for dividing into portions. If the density of the extruded dough strand is constant within predetermined limits, a density measurement can be dispensed with, which simplifies the method. If, in addition, the extrusion takes place in such a way that the dough strand is extruded with a constant cross section within predetermined limits, the volume measurement can even be dispensed with, so the division into portions is reduced to a pure time measurement between two cutting processes on the continuously extruded dough strand.

A measuring station, in which the volume measurement and/or the density measurement takes place while the dough strand runs through at least one corresponding measuring station, may, in particular, have a modular construction, so various types of measuring stations can be arranged successively or exchangeably with one another.

An optical measurement can be carried out very precisely. An optical 3D scanning measurement or another imaging measuring method known from optical image processing may be used here.

A density measurement, in which the density measurement takes place with the aid of X-ray beams, leads to a very precise density measuring result. Alternatively, a density measurement may also take place by means of an electrical conductance measurement or a capacitive sensor system with respect to the dough strand.

A strand rolling the dough strand portions between the division into portions and supplying to post-shape the dough strand portions, optimises the consistency of the produced baked goods. The result of the strand rolling is a substantially cylindrical dough portion.

With regard to the plant, the object mentioned at the outset is achieved according to invention by a plant for the automatic production of baked goods using a dough strand
with a kneading device for kneading a dough from prepared starting products,
with an extruder for extruding the dough to form the dough strand,
with a portioning device to divide the dough strand into dough strand portions of a predetermined weight,
with a post-preparation device for finishing the baked goods from the dough strand portions.

The advantages of the plant according to the invention correspond to those which were already mentioned above in conjunction with the production method according to the invention. In the plant according to the invention, a conventional dough dividing machine, as known, for example, from EP 1 424 900 A2, and a rounder also known therefrom, can be dispensed with. A production of, for example, 12000 toast loaves per hour, each of 500 g, can be achieved, for example, with the plant according to the invention. The kneading device and the extruder of the plant may be combined in a shaft dough kneader. In this case, two kneading extruder shafts may be used, in particular. A supply device for the, in particular, automatic supply of the starting products to produce the dough to be kneaded may be arranged upstream of the kneading device. The extruder may have a single nozzle, a twin nozzle or else a plurality of separate individual nozzles.

A post-preparation device comprising:
at least one transporting mould,
a transfer device for supplying the dough strand portions to associated receivers in the at least one transporting mould,
a fermenting cabinet to ferment the dough strand portions in the transporting mould,
a baking oven for baking the dough strand portions, may be adapted to the throughput of the dough strand extrusion. The fermenting cabinet may also be configured as a paternoster fermenting cabinet. The fermenting cabinet may be a post-fermenting cabinet. A subdivision of the fermenting process into pre-fermenting and post-fermenting is dispensed with.

The advantages of the portioning devices comprising a volume measuring device to measure the volume of the dough strand, a density measuring device to measure the density of the dough strand, in which the volume measuring device and/or the density measuring device is configured as a measuring station, which is configured for the dough strand to run through, and in which the density measuring device has an X-ray radiographic device, correspond to those which were already discussed above in conjunction with the production method. A division into portions can also alternatively take place by weighing on a weighing belt, for example by means of weighing cells.

A volume measuring device being designed as an optical scanning device may be a scanning device illuminating the dough strand from above. Alternatively, a plurality of scanning devices of this type may also be provided as part of the optical scanning device, which may complement each other, for example, to form a 3D scanner to optically detect the entire dough strand volume. The optical scanning device may have two scanning devices, which detect the dough strand from above and from below or else from both sides transverse to the transporting direction. An arrangement with two scanning devices, which both scan the dough strand from above, but from different detection directions, is also possible. When scanning the dough strand from below, this may also take place, in particular, by means of a transporting belt which is transparent to the scanning light of the scanning device. A dough strand transporting belt of this type may be designed as a net or from a material which is at least partially transparent to the scanning light. A detection of the dough strand by a scanning device from below may also take place by a free guidance of the dough strand such that the dough strand is freely accessible from below at least in one portion.

At least one strand roller for strand rolling the dough strand portions in the conveying path of the dough strand between the portioning device and the receiver in the at least one transporting mould may be part of the transfer device of the plant.

At least two strand rollers, which are synchronised in such a way that they alternately process divided dough strand portions, increase the throughput of the post-preparation device.

The same applies to a transfer device and a transporting mould-conveying device, in which the transfer device has a synchronisation signal connection with a conveying device for the at least one transporting mould.

An embodiment of the invention will be described in more detail below with the aid of the drawings.

DESCRIPTION OF THE PREFERRED EMBODIMENT

Figure 1:
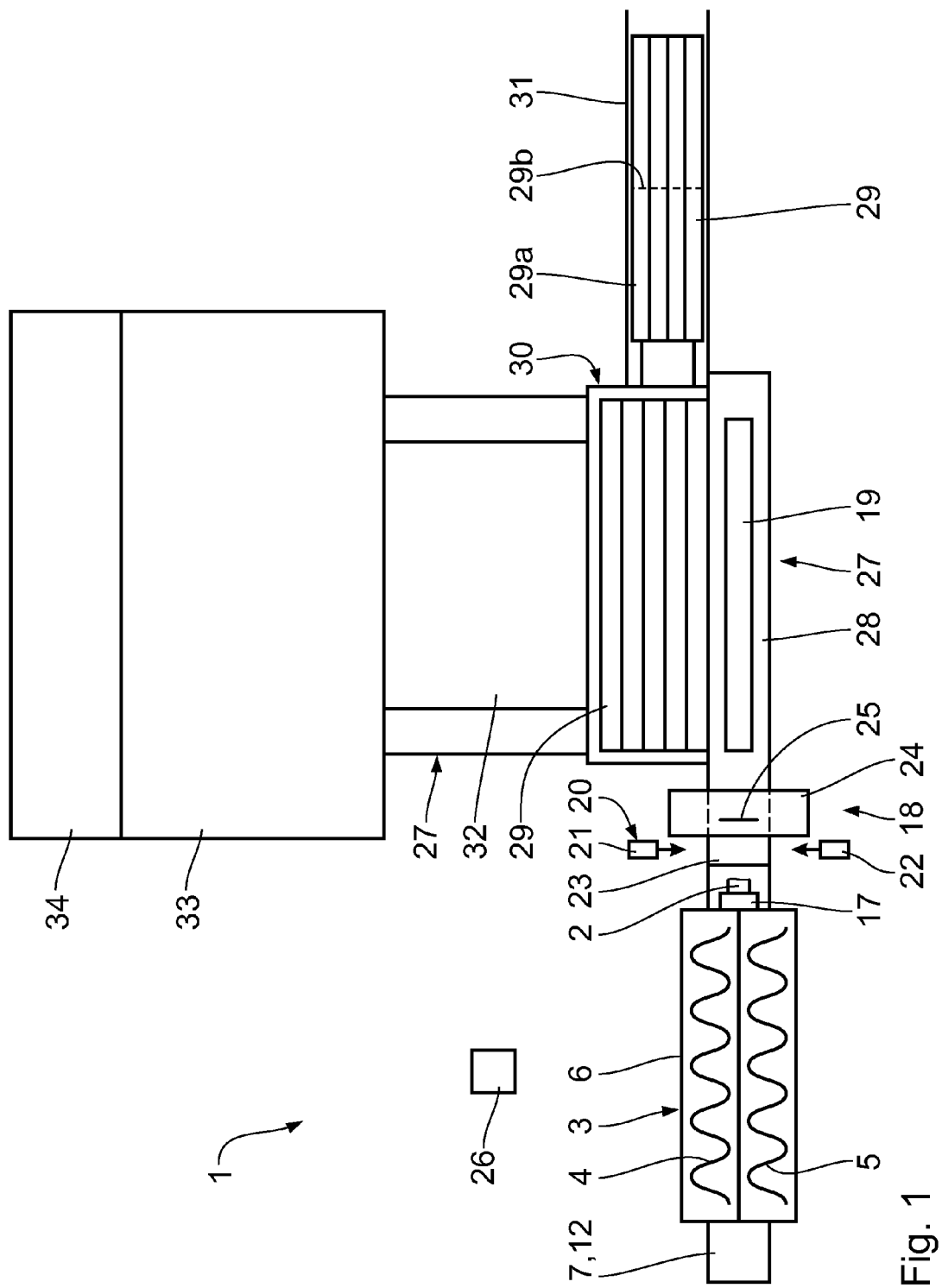
FIG. 1 schematically shows a plan view of the main components of a plant to automatically produce bread for toast.

A plant 1 for the automatic production of baked goods, in the embodiment shown, bread for toast, using a dough strand 2 is shown schematically with its main components in FIG. 1 in a plan view, not true to scale.

A twin shaft dough kneader 3 is used, on the one hand, as a kneading device to knead a dough made of prepared starting products and, on the other hand, as an extruder to extrude the dough to form the dough strand 2. The dough kneader 3 has two kneading/extruder shafts 4, 5, which run in a manner rotatably driven next to one another in a common housing 6 of the dough kneader 3. A basic structure of the dough kneader 3 is known from the brochure "Kontinuierliche Knetmaschine ZPM" from Werner & Pfleiderer Industrielle Backtechnik, print date September 2000. Furthermore, the basic structure of the dough kneader 3 is known from the technical article "Development of continuous vacuum dough preparation process for industrial bakeries (COVAD)" research summary sheet No. 2003-8, published by the Campden & Chorleywood Food Research Association.

Figure 2:
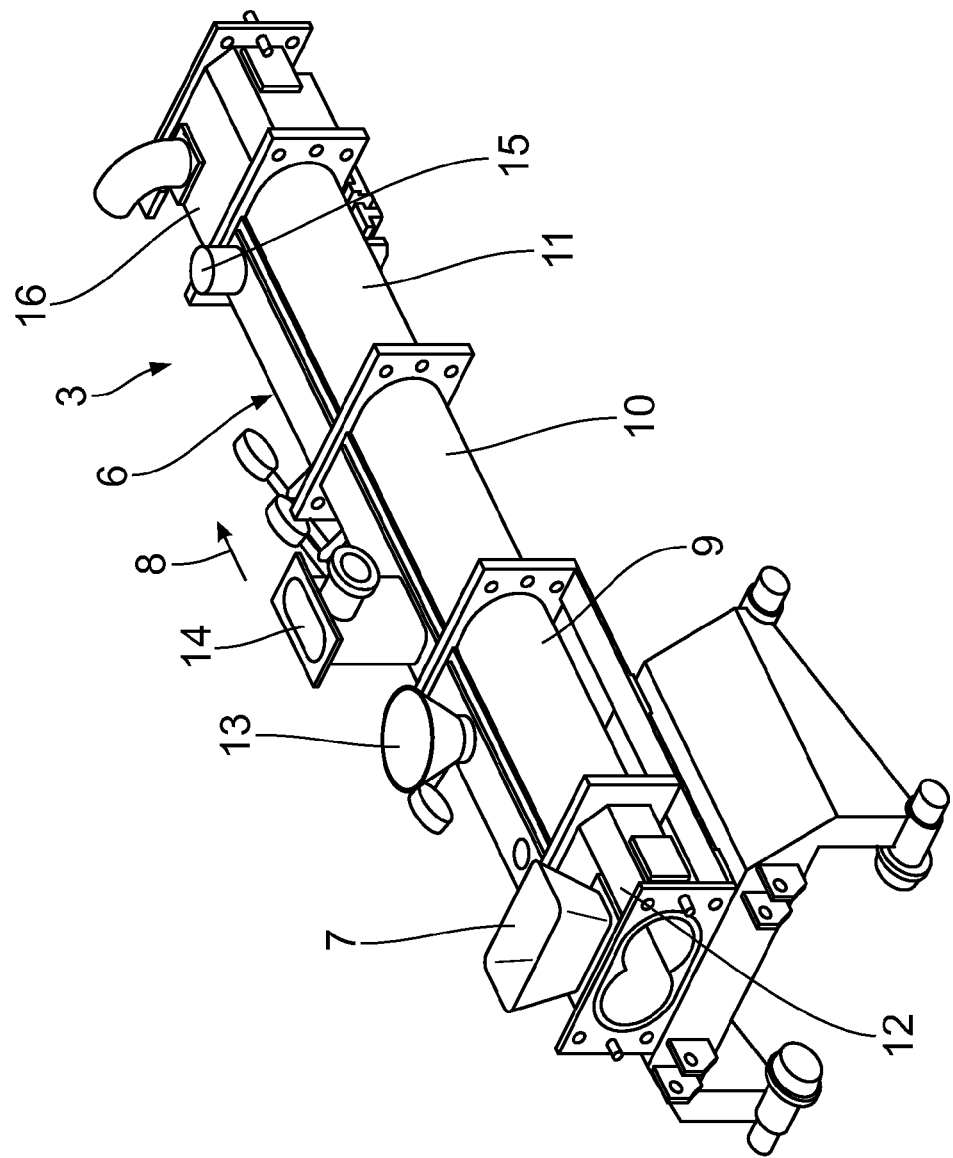
FIG. 2 perspectively shows main components of a twin shaft dough kneader to knead and extrude a toast bread dough.

FIG. 2 shows details of the dough kneader 3. The latter has a feed funnel 7 to pour the dough into the housing 6. The dough is transported in the dough kneader by the two rotating shafts 4, 5 in the direction of the arrow 8 in FIG. 2.

The housing 6 is subdivided in the transporting direction 8 into three housing portions 9, 10, 11, which adjoin a feed portion 12 with the feed funnel 7. An excess pressure is firstly produced by means of a pressure connection 13 in the housing portion 9 following the feed portion 12 in the transporting direction 8. In the housing portion 9, an excess pressure of, for example, 1.2 bar can be achieved. An absolute pressure of 1,200 mbar is then present in the housing portion 9. In the housing portion 9, an absolute pressure in the range between 1,000 mbar and 3,000 mbar can be adjusted.

In the housing portion 10 adjoining this in the transporting direction 8, an excess pressure is produced by means of a suction connection 14. In the housing portion 10, an air pressure reduced to 300 mbar in relation to the normal ambient pressure can be achieved. In the housing portion 10, the absolute air pressure can be adjusted in the range between close to 0 mbar and the atmospheric pressure.

The pressure connection 13 communicates with a pressure source, not shown. The suction connection 14 communicates with a vacuum pump, not shown in more detail.

The housing portion 11, which is adjacent in the transporting direction 8, has a feed opening 15, by means of which further constituents or additives can be added to the dough after the pressure treatment in the housing portion 9 and after the vacuum treatment in the housing portion 10. Adjacent to this third housing portion 11 is a discharge portion 16 of the housing 6. The discharge portion 16 has a nozzle 17 (cf. FIG. 1), through which the dough strand 2 is extruded. Of the dough strand 2, only a short, broken portion is shown in FIG. 1, directly after the nozzle 17. Instead of an individual nozzle 17, a twin nozzle, or a plurality of separate nozzles can be provided instead of the nozzle 17.

In a variant of the plant 1, not shown, a 90° bent piece is arranged downstream of the nozzle 17, to deflect the dough strand transporting direction. A side arrangement of the nozzle 17 is also possible, so an extrusion direction of the dough strand 2 is not located parallel to the longitudinal extent of the kneading/extruder shafts 4, 5, but perpendicular thereto.

A portioning device 18 follows the nozzle 17 in the extrusion direction of the dough strand 2, in order to divide the dough strand 2 into dough strand portions 19.

The portioning device 18 has an optical scanning device 20 as a volume measuring device to measure the volume of the dough strand 2. In the configuration shown in FIG. 1, this is designed as a 3D scanner with two scanning units 21, 22. Instead of the scanning units 21, 22, a ring sensor may also be used, which is arranged around a driven conveyor belt 23 of the plant 1, on which the dough strand 2 is conveyed after the nozzle 17. Instead of the scanning units 21, 22, an individual camera may also be arranged above the conveyor belt 23. Corresponding volume measuring units are known from WO 2007/022 782 A2 and from WO 2008/093 364 A1, for example for dividing meat into portions. The conveyor belt 23 may be configured as a driven pusher roller.

A dough strand cutting knife 24 in the form of a guillotine with a cutting blade 25 also belongs to the portioning device 18. The scanning units 21, 22 and the cutting knife 24 have a signal connection via signal lines, not shown, with a central control device 26, which controls the main components of the plant 1 shown in FIG. 1 on the basis of operating data detected and measured data detected, for example by means of the scanning units 21, 22. A post-preparation device 27 of the plant 1 is used to finish the baked goods, in other words the toast loaves in the configuration shown, from the dough strand portions 19.

The post-preparation device 27, in the configuration according to FIG. 1, includes a weighing/measuring belt 28, with which the division into portions by the portioning device 18 can again be controlled or by means of which a division of the dough strand 2 into the dough strand portions 19, which is alternative to the division into portions with the optical scanning device 20, can be brought about. The weighing/measuring belt 28, as a transfer device for supplying the dough strand portions 19 to associated receivers 29a of a transporting mould 29, has an ejection roller, which is not shown in more detail in FIG. 1. The transporting mould 29 has a plurality of receivers 29a to receive a respective dough strand portion 19. The transporting mould 29 is thus a composite, for example, of two or four receivers 29a of this type. The receivers 29a have a length of up to 3,000 mm. In the configuration shown, the receivers 29a have a length in the range between 1,850 and 2,000 mm. As the transporting mould 29 is subsequently also guided through a baking oven, the transporting mould 29 or the receivers 29a are also called baking moulds.

One of the dough strand portions 19, in each case, arrives via the ejection roller at an automatic strand rolling machine or strand roller 30 for strand rolling the dough strand portions 19. The strand roller 30 may be taken to mean a part of the transfer device for supplying the dough strand portions 19 to the transporting moulds 29. The automatic strand rolling machine 30 may, as shown in FIG. 1, have two strand rollers located next to one another transverse to the extrusion direction of the dough strand 2, one of the transporting moulds 29 being associated with said strand rollers in each case. An alternating feed of the dough strand portion 19 takes place via the ejection roller for the respective receiving preparation of the two strand rollers of the automatic strand rolling machine 30.

Each of the strand rollers has three rollers. The dough strand portion 19 fed to the strand roller is rolled between two of these three rollers. A third roller arranged thereabove is height-adjustable in such a way that the length of the dough strand portion 19 can be adjustably predetermined by means of corresponding pressing of this third roller against the rolled dough strand portion 19. In this manner, the length of the dough strand portion 19 is adapted to the length of the receivers 29a of the associated transporting mould 29.

The automatic strand rolling machine 30 has an ejection device for ejecting the respectively long-rolled dough strand portion 19 into the transporting mould 29 associated with the respective strand roller. This ejection device is also a component of the transfer device for supplying the dough strand portions 19 from the portioning device 18 to the respective transporting mould 29. This transfer device has a signal connection with a conveying device 31 for the transporting moulds 29 by means of the signal device 26, for synchronisation.

After the automatic strand rolling machine, a supply belt can be used, which ensures a supply of the strand-rolled dough strand portions 19 to the transporting moulds 29.

A supply belt of this type can also be dispensed with. In this case, the transporting moulds 29 are moved with the transfer device under the strand rolling machine 30. When the rollers of the automatic strand rolling machine 30 are opened, the latter delivers the strand-rolled dough strand portion into a depositing star. This depositing star rotates about an axis parallel to the longitudinal axis of the dough strand portions and, by means of this rotation, delivers the strand-rolled dough strand portion 19 into the respective receiver 29a of the transporting mould 29. The depositing star is used as a time buffer between the automatic strand rolling machine 30 and a subsequent mould transport. Time tolerances between a depositing time of the automatic strand rolling machine 30 and a provision of the transporting mould 20 are thereby compensated.

In the embodiment shown, the automatic strand rolling machine 30 is located above the respectively supplied transporting mould 29 and is configured on a platform.

The positioning of the dough strand portions 19 in the transporting mould 29 associated with the respective strand roller is carried out with a high degree of positioning precision. With an exemplary diameter of the dough strand portions 19 of 80 mm and a length of the dough strand portions 19 of 1,500 mm, it is ensured by the ejection device that the dough strand portions are ejected with a precise aim into the receivers 29a with a short side length of 100 mm. The positioning tolerance of the ejection device transverse to the dough strand portions 19 is thus better than +/−10 mm. A corresponding positioning precision of the ejection device also exists in the longitudinal direction of the dough strand portions 19.

The conveying device 31 ensures that a transporting mould 29 ready to receive the long-rolled dough strand portion 19 is available after the strand rolling in the automatic strand rolling machine 30 below the ejection device of the automatic strand rolling machine 30 at the correct time.

The length of the receivers 29a may also be a fraction of the total length of the transporting mould 29. This is illustrated in FIG. 1 by a dashed separating line 29b. In this case, twice the number of long-rolled dough strand portions 19 of half the length is accommodated in the transporting mould 29. Per transporting mould 29, a correspondingly higher number of preparing strand rollers may then be used in the automatic strand rolling machine 30, for example four strand rollers. This increases the throughput of the plant 1.

A further conveying device 32 to convey the transporting moulds 29 from the automatic strand rolling machine 30 to a fermenting cabinet or post-fermenting cabinet 33 is arranged downstream of the automatic strand rolling machine 30 in the conveying direction of the long-rolled dough strand portions 19. A baking oven 34 is arranged downstream from said fermenting cabinet. The transfer from the conveying device 32 to the fermenting cabinet 33 may take place step-wise. The fermenting cabinet 33 may be configured as a paternoster fermenting cabinet.

The portioning device 18, on the one hand, and the weighing/measuring belt 28, on the other hand, are measuring stations of the plant 1. The optical scanning device 20 is a measuring station to measure the volume of the dough strand 2.

A horizontal transport of the dough strand portions 19 transverse to the longitudinal direction thereof takes place in the plant 1 during the supply of the dough strand portions 19 to the automatic strand rolling machine 30, during the removal of the rolled dough strand portions 19 from the automatic strand rolling machine 30 to the transporting mould 29, in other words for depositing the dough strand portion composite to be further processed in the receivers 29a, during the transport of the dough strand portions 19 through the fermenting cabinet 33, during the transport of the transporting moulds 29 to the fermenting cabinet 33 via a transfer device to a transporting belt of the baking oven 34, during the transport of the transporting moulds 29 through the baking oven 34 configured as a tunnel oven and during the transport of the transporting moulds 29 after a baking oven unloading device to a finishing device.

Vertical transport of the dough strand portions 19 transverse to their longitudinal extent takes place during the transfer from the supply belt or weighing/measuring belt 28 into the automatic strand rolling machine 30, during the transfer of the dough strand portions 19 from the automatic strand rolling machine 30 onto a supply belt to the receivers 29a in the transporting mould 29 and during the transport of the transporting moulds 29 in the fermenting cabinet 33.

The plant 1 works to produce baked goods, in particular for producing bread for toast, in the following manner: firstly the dough added by means of the feed funnel 7 from the prepared starting products is kneaded in the dough kneader 3 and extruded as a dough strand 2 via the nozzle 17. Alternatively, the dough can firstly be produced before kneading from starting products continuously supplied by a conveying device, not shown. A volume measurement of the dough strand 2 then takes place by means of the optical scanning device 20. This dough strand is then divided by the cutting knife 24 into the dough strand portions 19 of predetermined weight. The divided dough strand portion 19 is then long-rolled by means of the conveyor belt 23, the weighing/measuring belt 28, the ejection roller, the automatic strand rolling machine 30 and the ejection device and supplied to the receiver 29a associated with it of the transporting mould 29.

The long-rolled dough strand portions 19 with the transporting moulds 29, which were provided by the conveying device 31, are then transported by the conveying device 32 to the fermenting cabinet 33. The long-rolled dough strand portions 19 are fermented there. The fermented dough strand portions 19 are then baked to form toast loaves in the following baking oven 34.

During the transport of the transporting moulds 29 from the post-fermenting cabinet 33 by means of a transfer device, the transporting moulds 29 can additionally be covered, in order, for example, to later ensure a square shape of toast bread slices as a result of the dough processing. Lids to cover the transporting moulds 29 are placed before the baking oven 34 by a transverse transporting device that conveys the lids on the transporting moulds 29 with the aid of a gripper system. After a baking oven unloading device, the lids are in turn removed by means of a gripper system from the transporting moulds 29 and supplied to a lid return transporting device. The transporting moulds 29 with the baked dough strand portions 19 still located therein, which are then present as bars of bread, are supplied to a mould emptying device. With the aid of a suction system or a mould turning device, the transporting moulds 29 are emptied and supplied for reoccupation by dough strand portions. The bars of bread are then cooled to cutting consistency. This can take place by means of a continuous suspension carrier system. The bars of bread are pushed on to carriers here, which, fastened on both sides to chains, transport, vertically and/or horizontally, a corresponding transport system during a required cooling time. As an alternative to a cooling by means of the suspension carrier system, a vacuum cell installed inline may be used. A vacuum cell of this type may simultaneously prevent contamination of the bars of bread with spores.

Up to 7 tonnes of dough per hour can be processed using the plant 1, which corresponds to a quantity of about 12,000 toast loaves per hour with a loaf weight of 500 g. A typical slice size of 100 mm×100 mm×10 mm or of 120 mm×120 mm×10 mm can be achieved.

Figure 3:
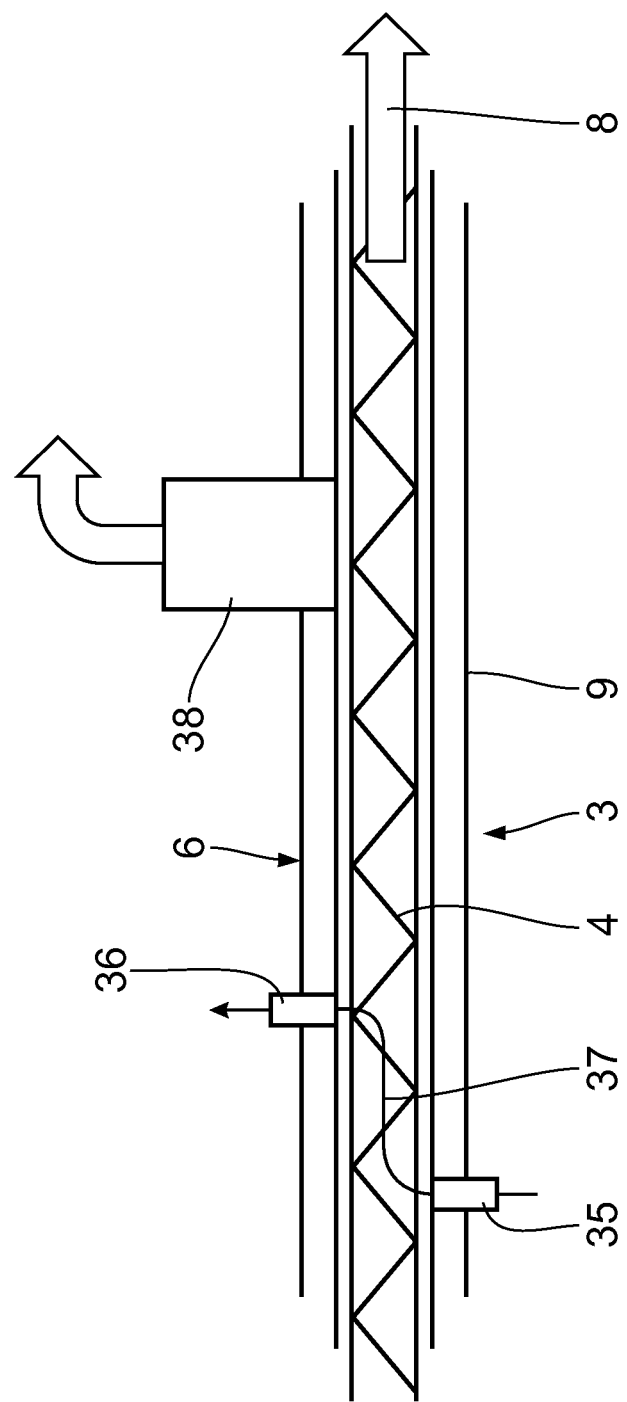
FIG. 3 schematically shows a longitudinal section of a broken portion of a housing of a further configuration of the dough kneader in the region of one of the shafts.

FIG. 3 shows a modification of the dough kneader 3 in the region of one of the housing portions 9 to 11, for example in the region of the housing portion 9. In an upstream region of the housing portion 9, an air flow 37 is produced via an inlet 35 and an outlet 36 arranged opposing the housing portion 9 and offset in the transport direction 8. For this purpose, the inlet 35 communicates with a corresponding compressed air source. Arranged in a downstream region of the housing portion 9 is a further air outlet 38, by means of which a negative pressure can selectively be produced in this region of the housing portion 9. A fine specification of the pressure conditions in the housing portion 9 can be achieved by the modification according to FIG. 3. This may, for example, be used for the targeted equalisation of the pore size and the pore density in the dough strand 2 produced.

Water is added together with the dough to the dough kneader 3 during operation of the plant 1. This water can be enriched with oxygen. The oxygen enrichment may, for example, take place by adding an oxygen-containing gas to produce a spray mist, as described, for example, in EP 1 714 556 A2.

Basically, a targeted addition of liquids, gases or solids may take place at various points of the 2-shaft dough kneader 3 to thereby influence the kneading result in a manner promoting the production of baked goods.

In a configuration not shown, a density measurement of the dough strand can take place in a measuring station configured, for example, as an X-ray radiographic device.

The invention claimed is:

1. A method for the production of baked goods using a very long dough strand comprising the following steps:
   kneading, using a kneading device, a dough from prepared starting products to form a kneaded dough, the step of kneading comprising passing the dough, in order, through a first portion of the kneading device in which the dough is subjected to an adjustable pressure treatment, a second portion of the kneading device in which the dough is subjected to a vacuum treatment, and a third portion of the kneading device in which additives may be added to the dough,
   extruding, using an extruder located downstream of the kneading device, the kneaded dough to form the very long dough strand, the very long dough strand having a length of 3 m or 1.5 m,
   measuring, using a volume measuring device located downstream of the extruder, the volume of the extruded very long dough strand,
   dividing, at a cutting station, the measured very long dough strand into dough strand portions of a predetermined weight based on the measured volume,
   supplying the dough strand portions to associated receivers in at least one transporting mould, which is also a fermenting carrier,
   fermenting the dough strand portions in the transporting mould, and
   baking the fermented dough strand portions.

2. A method according to claim 1, wherein the volume measurement takes place while the very long dough strand runs through the volume measuring device.

3. A method according to claim 1, wherein the volume measurement takes place optically.

4. A method according to claim 1, further comprising strand-rolling the dough strand portions between the division into portions and supplying.

5. A plant for the automatic production of baked goods using a very long dough strand, comprising:
   a kneading device for kneading a dough from prepared starting products to form a kneaded dough, the kneading device comprising a first portion in which the dough is subjected to an adjustable pressure treatment, a second portion in which the dough is subjected to a vacuum treatment, and a third portion in which additives may be added to the dough,
   an extruder, located downstream of the kneading device, for extruding the kneaded dough to form the very long dough strand, the very long dough strand having a length of 3 m or 1.5 m,
   a portioning device located downstream of the extruder to divide the very long dough strand into dough strand portions of a predetermined weight, wherein the portioning device comprises a volume measuring device to measure the volume of the very long dough strand to determine where to divide the very long dough strand to achieve the predetermined weight, and
   a post-preparation device, located downstream of the portioning device, for finishing the baked goods from the dough strand portions,
   wherein the post-preparation device comprises:
   at least one transporting mould,
   a transfer device for supplying the dough strand portions to associated receivers in the at least one transporting mould,
   a fermenting cabinet to ferment the dough strand portions in the transporting mould, and
   a baking oven for baking the dough strand portions.

6. A plant according to claim 5, wherein the volume measuring device is configured as a measuring station, which is configured for the very long dough strand to run through.

7. A plant according to claim 5, wherein the volume measuring device comprises an optical scanning device.

8. A plant according to claim 5, further comprising an automatic strand rolling machine with at least one strand roller for strand rolling the dough strand portions in the conveying path of the very long dough strand between the portioning device and the receiver in the at least one transporting mould.

9. A plant according to claim 8, further comprising at least two strand rollers, which are synchronised in such a way that the at least two strand rollers alternately process divided dough strand portions.

10. A plant according to claim 5, wherein the transfer device has a synchronisation signal connection with a conveying device for the at least one transporting mould.

* * * * *